United States Patent
Sixtensson et al.

(10) Patent No.: US 10,768,069 B2
(45) Date of Patent: Sep. 8, 2020

(54) PRESSURE MEASURING DEVICE FOR PROTECTION OF PRESSURE SENSOR FROM THERMOMECHANICAL STRESS

(71) Applicant: Endress + Hauser GmbH + Co. KG, Maulburg (DE)

(72) Inventors: Daniel Sixtensson, Potsdam (DE); Andreas Guth, Stahnsdorf (DE); Rene Ziermann, Kleinmachnow (DE); Dennis Muller, Gross Kreutz OT (DE)

(73) Assignee: ENDRESS+HAUSER SE+CO.KG, Maulburg (DE)

( * ) Notice: Subject to any disclaimer, the term of this patent is extended or adjusted under 35 U.S.C. 154(b) by 77 days.

(21) Appl. No.: 15/537,900

(22) PCT Filed: Nov. 18, 2015

(86) PCT No.: PCT/EP2015/076914
§ 371 (c)(1),
(2) Date: Jun. 20, 2017

(87) PCT Pub. No.: WO2016/102120
PCT Pub. Date: Jun. 30, 2016

(65) Prior Publication Data
US 2017/0350783 A1 Dec. 7, 2017

(30) Foreign Application Priority Data
Dec. 22, 2014 (DE) .......... 10 2014 119 396

(51) Int. Cl.
*G01L 19/14* (2006.01)
*G01L 19/04* (2006.01)

(52) U.S. Cl.
CPC ............ *G01L 19/146* (2013.01); *G01L 19/04* (2013.01); *G01L 19/145* (2013.01); *G01L 19/147* (2013.01)

(58) Field of Classification Search
CPC ... G01L 1/00; G01L 9/00; G01L 19/00; G01L 9/0048
See application file for complete search history.

(56) References Cited

U.S. PATENT DOCUMENTS 4,168,630 A * 9/1979 Shirouzu ............... G01L 19/147
257/419
4,314,225 A * 2/1982 Tominaga ........... G01L 19/0084
228/262.9
(Continued)

FOREIGN PATENT DOCUMENTS

CN 102257372 A 11/2011
DE 3128188 A1 4/1982
(Continued)

OTHER PUBLICATIONS

German Search Report, German PTO, Munich, dated Sep. 1, 2015.
(Continued)

*Primary Examiner* — Tran M. Tran
(74) *Attorney, Agent, or Firm* — Bacon & Thomas, PLLC

(57) ABSTRACT

A pressure measuring device comprises a carrier, a base which is connected to the carrier, and a pressure sensor which is mounted on the base, wherein a bottom base area of the pressure sensor is greater than a top base area of the base, the pressure sensor being protected against thermomechanical stresses by an end of the base, which is facing away from the pressure sensor, the end being adhesively bonded into a recess in the support by an adhesive bond.

11 Claims, 2 Drawing Sheets

(56) References Cited

U.S. PATENT DOCUMENTS

| | | | |
|---|---|---|---|
| 4,499,774 A | 2/1985 | Tsuchiya et al. | |
| 4,675,643 A * | 6/1987 | Tanner | G01L 19/0084 338/3 |
| 4,680,569 A * | 7/1987 | Yamaki | G01L 19/0084 338/36 |
| 4,961,105 A * | 10/1990 | Yamamoto | G06K 19/07745 174/564 |
| 5,049,421 A | 9/1991 | Kosh | |
| 5,285,690 A * | 2/1994 | Koen | G01L 9/0042 29/621.1 |
| 5,315,155 A * | 5/1994 | O'Donnelly | H01L 21/52 257/706 |
| 5,515,732 A * | 5/1996 | Willcox | G01L 9/0042 73/718 |
| 5,605,360 A * | 2/1997 | Kurisaki | G01L 19/0007 73/756 |
| 5,611,148 A * | 3/1997 | Affa | G01D 5/34707 33/702 |
| 5,629,566 A * | 5/1997 | Doi | H01L 21/563 257/711 |
| 5,635,649 A * | 6/1997 | Tobita | G01L 19/0084 73/708 |
| 5,695,590 A * | 12/1997 | Willcox | G01L 9/0042 156/272.2 |
| 5,852,320 A * | 12/1998 | Ichihashi | G01L 19/0038 257/419 |
| 5,969,591 A * | 10/1999 | Fung | G01L 9/0042 338/4 |
| 6,127,713 A * | 10/2000 | Takeuchi | G01L 19/147 257/419 |
| 6,169,316 B1 * | 1/2001 | Sakai | G01L 19/146 257/417 |
| 6,255,728 B1 * | 7/2001 | Nasiri | G01L 19/0038 257/666 |
| 6,624,523 B2 * | 9/2003 | Chao | H01L 23/24 257/796 |
| 6,768,196 B2 * | 7/2004 | Harney | B81B 7/0048 257/729 |
| 6,935,179 B2 * | 8/2005 | Banholzer | G01L 9/0075 73/700 |
| 6,946,742 B2 * | 9/2005 | Karpman | B81B 7/0048 257/707 |
| 7,234,358 B2 * | 6/2007 | Saito | G01L 19/0084 73/753 |
| 7,370,536 B2 * | 5/2008 | Ueyanagi | G01L 19/0084 73/715 |
| 7,600,433 B2 * | 10/2009 | Koehler | G01L 19/147 73/753 |
| 7,615,835 B2 * | 11/2009 | Takemasa | G01P 1/006 257/417 |
| 7,661,318 B2 * | 2/2010 | Brosh | G01L 19/146 73/715 |
| 7,798,010 B2 * | 9/2010 | Morales | G01L 19/146 73/760 |
| 7,861,595 B2 * | 1/2011 | Brown | G01L 19/0645 73/706 |
| 7,861,598 B2 * | 1/2011 | Drewes | G01L 19/147 73/756 |
| 7,964,448 B2 * | 6/2011 | Elian | H01L 21/565 257/E21.501 |
| 8,276,460 B2 * | 10/2012 | Bradley | G01L 19/147 73/706 |
| 8,304,844 B2 * | 11/2012 | Getman | G01L 19/147 257/414 |
| 8,344,487 B2 * | 1/2013 | Zhang | H01L 23/3107 257/669 |
| 8,516,897 B1 * | 8/2013 | Jones | G01L 19/147 257/414 |
| 8,733,175 B2 * | 5/2014 | Ooya | G01L 19/04 73/706 |
| 8,969,981 B2 * | 3/2015 | Kanai | H01L 23/562 257/419 |
| 10,012,334 B2 * | 7/2018 | Dohi | G01L 9/0051 |
| 10,274,388 B2 * | 4/2019 | Sekiya | G01L 9/0048 |

FOREIGN PATENT DOCUMENTS

| | | |
|---|---|---|
| DE | 3436440 A1 | 4/1986 |
| DE | 102007053859 A1 | 5/2009 |
| DE | 102009028258 A1 | 2/2011 |
| DE | 102009046692 A1 | 5/2011 |
| DE | 102014119396 A1 | 6/2016 |
| WO | 94/05988 A1 | 3/1994 |

OTHER PUBLICATIONS

International Search Report, EPO, The Netherlands, dated Feb. 10, 2016.
Chinese Office Action in corresponding Chinese Application No. 20150069810.5, dated Dec. 18, 2018.
Chinese Office Action in corresponding Chinese Application No. 201580069810.5, dated Mar. 5, 2020.

* cited by examiner

PRESSURE MEASURING DEVICE FOR PROTECTION OF PRESSURE SENSOR FROM THERMOMECHANICAL STRESS

TECHNICAL FIELD

The present invention relates to a pressure measuring device having a carrier, a base connected to the carrier, and a pressure sensor mounted on the base whose base surface is larger than a base surface of the base.

BACKGROUND DISCUSSION

Pressure measuring devices are used for the measurement of pressures—especially, absolute pressures, relative pressures, and differential pressures—and are used in industrial measurement technology.

In pressure measurement technology, so-called semiconductor pressure sensors are frequently used. Semiconductor sensors are today regularly produced that are based upon silicon, e.g., using silicon-on-insulator (SOI) technology. They are fashioned, for example, as pressure sensor chips that typically have a membrane carrier and a measurement membrane arranged on the membrane carrier.

These pressure sensors are very sensitive and are therefore placed in a housing that as a rule is metallic, and are subjected to the pressure to be measured via a diaphragm seal that is connected upstream and that is filled with a liquid that transmits pressure. The housing and the pressure sensor are thus made of different materials that have very different coefficients of thermal expansion. Therefore, as a result of the mechanical connection between the housing and the pressure sensor required for the sensor assembly, mechanical stresses can occur that affect the transmission characteristic of the measurement membrane, thus impairing the achievable measurement precision and its reproducibility. This holds especially for a temperature-dependent hysteresis of the measurement results.

In order to reduce temperature-dependent stresses acting on the pressure sensor, German Patent, DE 10 2007 052 364 A1 describes the arrangement of the pressure sensor chip on a ceramic intermediate carrier that has a coefficient of thermal expansion that matches the coefficient of thermal expansion of the semiconductor material. The intermediate carrier is glued directly onto a metallic carrier of the housing via an adhesive bond realized with an elastic adhesive. Kovar is indicated as the material for the carrier. Kovar has a coefficient of thermal expansion of 6 ppm/K, and is therefore significantly closer to the coefficient of thermal expansion of silicon—used for pressure sensors—of 2.6 ppm/K than more standard housing materials, which are also significantly lower in cost, such as stainless steel, which has a coefficient of thermal expansion of 16 ppm/K.

In the described pressure measurement devices, the ceramic intermediate carrier has a base surface that is larger than the base surface of the pressure sensor arranged thereon. This has the consequence that, despite the comparatively well-matched coefficient of thermal expansion of the intermediate layer, remaining thermal mechanical stresses can have effects on the pressure sensor over the entire base surface.

As an alternative to this, complementary solution approaches are known from the prior art, in which a reduction in temperature-dependent stresses acting on the pressure sensor is achieved by arranging the pressure sensor on a base whose base surface is significantly smaller than the base surface of the pressure sensor mounted thereon. For this purpose, two different specific embodiments are known, which are described, for example, in German Patent, DE 34 36 440 A1. In one specific embodiment, the base is an integral component of the metallic carrier of the housing, and is made of the material of the housing. In the second specific embodiment, the base is fashioned as a separate component that is placed into a bore in the carrier by means of a glazing. The glazing offers the advantage that it brings about an electrical insulation of the pressure sensor against the housing. However, the material combinations of the base material and the carrier material, between which hermetically-sealed glazings can be produced, are limited.

SUMMARY OF THE INVENTION

An object of the present invention is to indicate a pressure measuring device of the type cited above in which the pressure sensor is protected from thermomechanical stresses.

For this purpose, the present invention comprises a pressure measuring device having
  a carrier,
  a base connected to the carrier, and
  a pressure sensor mounted on the base, whose base surface is larger than a base surface of the base, distinguished in that an end of the base oriented away from the pressure sensor is glued into a recess in the carrier by means of an adhesive bond.

A development is distinguished in that the pressure sensor is mounted by means of a joint—especially, an adhesive bond; especially, an adhesive bond realized with an epoxy resin-based adhesive, a thermoplastic adhesive, or a silicon adhesive; especially, a silicon rubber, on an end of the base protruding from the recess; especially, a protruding end having a length on the order of a few tenths of a millimeter.

A first variant is distinguished in that the adhesive bond between the carrier and the base extends over an external jacket surface of the end of the base running in the recess.

A development of the first variant is characterized in that
  the base has an overall length of greater than or equal to 3 mm—especially, an overall length of from 3 mm to 7.5 mm, and
  the end of the base running in the recess has a length greater than or equal to 2.5 mm,
  the end of the base protruding from the recess and bearing the pressure sensor has a length of especially a few tenths of a millimeter—especially, on the order of 0.5 mm.

A second variant is distinguished in that the adhesive bond between the carrier and the base extends over an end surface of the base oriented towards a floor surface of the recess.

A third variant is distinguished in that the adhesive bond between the carrier and the base extends over an external jacket surface of the end of the base running in the recess and over an end face of the base oriented towards a floor surface of the recess.

A development of the second or third variant is distinguished in that base 3 has an overall length of less than or equal to 3 mm—especially, an overall length on the order of 0.5 mm to 3 mm.

A development is distinguished in that, in the recess, there is provided a centering device for centering the base—especially, a centering device formed by a base surface of the recess that tapers towards the base surface of the base—tapering in the direction of a floor surface of the recess onto which the base is placed.

A further development is distinguished in that the base is made of metal—especially, of stainless steel, Invar, or Kovar—of silicon carbide, or of an insulator—especially, of ceramic—especially, of aluminum oxide, silicon nitride, or aluminum nitride—or of glass—especially, borosilicate glass.

A further development is distinguished in that the adhesive bond between the base and the carrier is an adhesive bond realized with an adhesive based upon epoxy resin, a thermoplastic adhesive, or a silicon adhesive—especially, a silicon rubber.

A further development is distinguished in that the adhesive bond between the base and the carrier is an adhesive selected as a function of an adhesive surface available for the bonding of the base and the carrier, a more elastic adhesive being used, the larger the available adhesive surface is.

A further development is characterized in that
the pressure measuring device is a differential pressure measuring device or an absolute or relative pressure measuring device for measuring higher pressures—especially, pressures greater than or equal to 4 MPa (40 bar)—and
the base is made of a material—especially, of stainless steel, Invar, Kovar, or ceramic—especially, of aluminum oxide, silicon nitride, silicon carbide, or aluminum nitride—that has a modulus of elasticity greater than or equal to 200,000 MPa.

A further development is distinguished in that the base is made of a material that has a coefficient of thermal expansion that is matched to the coefficient of thermal expansion of the pressure sensor.

A further development is distinguished in that the base has a length in the range of 0.5 mm to 7.5 mm, an outer diameter in the range of 0.5 mm to 7 mm, and is bar-shaped or has an inner diameter in the range of 0.25 mm to 4 mm.

According to a preferred embodiment, the carrier is made of a metal—especially, of a stainless steel.

The pressure measuring device according to the invention has the advantage that, due to the base being set into a recess in the carrier via an adhesive bond that dissipates thermomechanical stresses, the pressure sensor is protected from temperature-dependent stresses acting thereon. Here, an adhesive bond surrounding the base externally has the advantage that this provides a large adhesive surface, so that, even with an adhesive that is very elastic and is therefore particularly well-suited for dissipating thermomechanical stresses, a mechanically solid and hermetically-sealed bond can be achieved. In connection with the base having a smaller base surface than the pressure sensor, in this way, a significant reduction is achieved in the temperature dependence of the measurement results. Moreover, there is a significantly greater flexibility with regard to the choice of material for the components used for the mounting of the pressure sensor, so that, even in connection with carriers made of a material that is more advantageous with regard to cost, such as a stainless steel, an improved measurement precision is achieved.

BRIEF DESCRIPTION OF THE DRAWINGS

The invention and its advantages will now be explained in detail using the figures in the drawing, which show three examples of embodiments. The same elements are indicated by the same reference numbers in the figures.

DETAILED DISCUSSION IN CONJUNCTION WITH THE DRAWINGS

Figure 1:
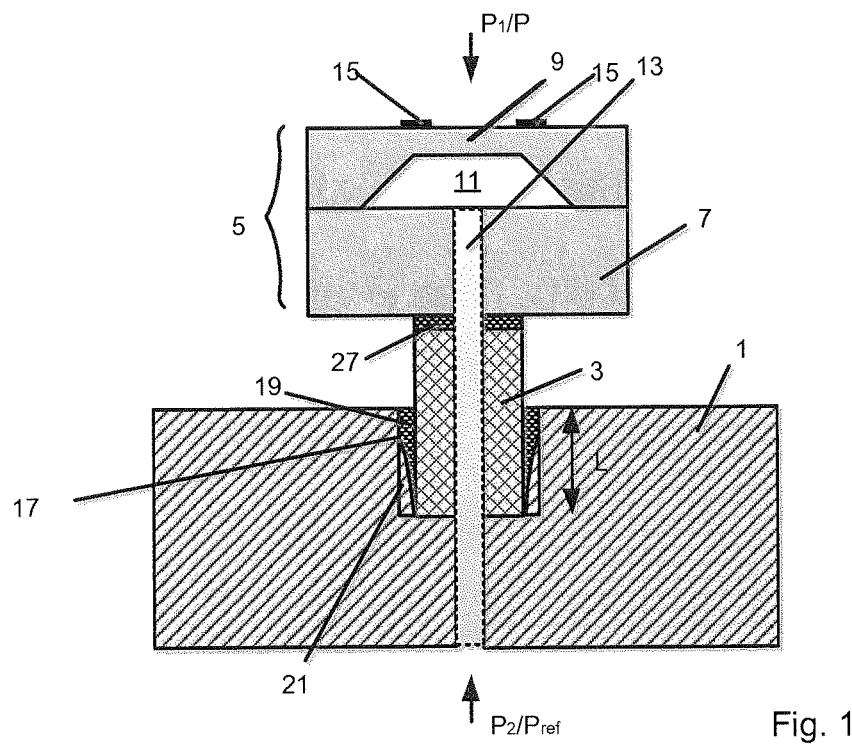
FIG. 1 shows: a pressure measuring device having an externally glued-in base.

FIG. 1 shows a pressure measuring device according to the present invention. It comprises a carrier 1, a base 3 connected to carrier 1, and a pressure sensor 5 mounted on base 3. Pressure sensor 5 is a so-called semiconductor pressure sensor, e.g., a silicon-based pressure sensor chip, and has, for example, a membrane carrier 7 and a measurement membrane 9 arranged thereon under which a pressure chamber 11 is enclosed.

The pressure measuring device can be fashioned as a differential pressure measuring device, as a relative pressure measuring device, or as an absolute pressure measuring device.

For the detection of differential pressures, a first side of measurement membrane 9 is subjected to a first pressure $p_1$ and its second side is subjected to a second pressure $p_2$ via a pressure transmission line 13—shown as a dashed line in FIG. 1—that runs through carrier 1, base 3, and membrane carrier 7 and that opens into pressure chamber 11. In this specific embodiment, the pressure difference acting on measurement membrane 9 between first and second pressures $p_1$, $p_2$ causes a deflection of measurement membrane 9 that is a function of differential pressure p that is to be measured.

For the detection of relative pressures, the first side of measurement membrane 9 is subjected to the pressure p that is to be measured, and the second side of measurement membrane 9 is supplied with, instead of second pressure $p_2$, a reference pressure $p_{ref}$, e.g., an ambient pressure, related to which the pressure p acting on the first side is to be measured. In this specific embodiment, the pressure difference acting on measurement membrane 9 between pressure p and reference pressure $p_{ref}$ causes a deflection of measurement membrane 9 that is a function of the relative pressure to be measured.

For the detection of absolute pressures, pressure chamber 11 enclosed under measurement membrane 9 is evacuated, and is completely sealed from the external environment by measurement membrane 9 and membrane carrier 7. In this case, pressure transmission line 13, which runs through carrier 1, base 3, and membrane carrier 7, leading to pressure chamber 11, is omitted, and pressure p acting on the first side of measurement membrane 9 causes a deflection of measurement membrane 9 that is a function of the absolute pressure to be measured.

In all three cases, the resulting deflection of measurement membrane 9 is registered via, for example, sensor elements 15 arranged on or in measurement membrane 9, e.g., piezoresistive elements connected together to form a resistance measuring bridge, and is converted into an electrical output signal that is then available for further processing and/or evaluation.

In differential pressure measuring devices and relative pressure measuring devices, base 3 is tubular in shape, and, in absolute pressure measuring devices, bar-shaped, and has a base surface that is smaller than the base surface of pressure sensor 5. As a result of this geometry, a decoupling is already brought about of measurement membrane 9 and carrier 1 that protects pressure sensor 5 from thermomechanical stresses.

Semiconductor pressure sensors usually have a base surface that is as a rule square in shape and whose size is on the order of 1 mm$^2$ to 100 mm$^2$, depending upon the measurement range and measurement sensitivity. In contrast, base 3 preferably has a circular or circular-annular base surface. Depending upon the size of the base surface of pressure sensor 5, the outer diameter of base 3 is preferably in the range of 0.5 mm to 7 mm. In the case of a bar-shaped base 3, this corresponds to a base surface on the order of approximately 0.2 mm$^2$ to 40 mm$^2$. In the case of bases 3 having a circular-annular base surface, the joint surface via which base 3 and pressure sensor 5 are connected to one another is still smaller, wherein base 3 with a circular-annular base surface preferably has an inner diameter in the range of 0.25 mm to 4 mm. Base 3 preferably has an overall length in the range of 0.5 mm to 7.5 mm. According to the present invention, this decoupling is reinforced in that carrier 1 has a recess 17, oriented towards pressure sensor 5, into which an end of base 3 is placed by means of an adhesive bond 19. To produce adhesive bond 19, adhesives based upon epoxy resin, thermoplastic adhesives, or silicon adhesives, such as silicon rubber, are especially suitable.

Adhesives are significantly more elastic than are rigid connections such as glazings, bonded connections, soldered connections, or welded connections, and are thus able to compensate for stresses resulting from the different coefficients of thermal expansion of carrier 1 and base 3. Adhesive bond 19 thus brings about a reduction in thermomechanical stresses that would otherwise act on or be transmitted to pressure sensor 5—especially, its measurement membrane 9. The reduction in thermomechanical stresses brought about by adhesive 19 is greater, the more elastic adhesive bond 19 is.

In order to achieve an adhesive surface that is as large as possible, adhesive bond 19 between base 3 and carrier 1 preferably extends over an external jacket surface of the end of base 3 running in recess 17. Here, the available adhesive surface increases linearly as length L of the end of base 3 placed into recess 17 increases, which length in turn corresponds to the depth of recess 17.

Adhesive bond 19, extending over the entire external jacket surface of base 3 situated in recess 17, offers the advantage of a comparatively large adhesive surface that makes it possible to achieve a comparatively high degree of tightness and strength, even given the use of a very elastic adhesive such as a silicon rubber.

Moreover, this specific embodiment offers the advantage that adhesive bond 19 is essentially exposed only to shearing loads distributed over the entire adhesive surface, which, in comparison with pressure-loaded or tension-loaded adhesive bonds, has the advantage of reduced deformation hysteresis that may occur under high pressure loading.

In the specific embodiment shown in FIG. 1, base 3 preferably has an overall length of greater than or equal to 3 mm—especially, an overall length of 3 mm to 7.5 mm—and the end of base 3 running in recess 17 preferably has a length L of greater than or equal to 2.5 mm, length L being determined as a function of the outer diameter of base 3, the pressure measurement range in which the pressure measuring device is to be used, and the adhesive used. In order to achieve an adhesive surface that is as large as possible, base 3 is preferably placed into recess 17 in such a way that the end of base 3, protruding from recess 17 and bearing pressure sensor 5, has a significantly smaller length than does the end running in recess 17. Here, it is sufficient if the end protruding from recess 17 has a minimum length of a few tenths of a millimeter—especially, on the order of 0.5 mm.

Preferably, in recess 17, there is provided a centering device 21 for centering base 3 in recess 17, by which a tipping of base 3 when being placed into recess 17, and during the subsequent adhesive process, is prevented. This is advantageous especially in connection with bases 3 having a comparatively large overall length—especially, an overall length greater than or equal to 3 mm—and/or with adhesive bonds 19 using an adhesive that has low viscosity during the carrying out of the adhesive process, because, here, the danger of tipping base 3 is particularly great. Centering device 21 is preferably formed by recess 17 having a base surface that tapers in the direction of its floor surface, onto which base 3 is placed, towards the base surface of base 3. This centering device 21 is preferably produced directly during the manufacture of recess 17, and in this case forms an integral component of carrier 1. Alternatively, a correspondingly-shaped insert can be placed into recess 17 of carrier 1.

Alternatively, instead of external adhesive bond 19 shown in FIG. 1, an adhesive bond 23 can be provided that extends over an end face, oriented towards a floor surface of recess 17, of the end of base 3 placed into recess 17. An exemplary embodiment of this is shown in FIG. 2.

Figure 3:
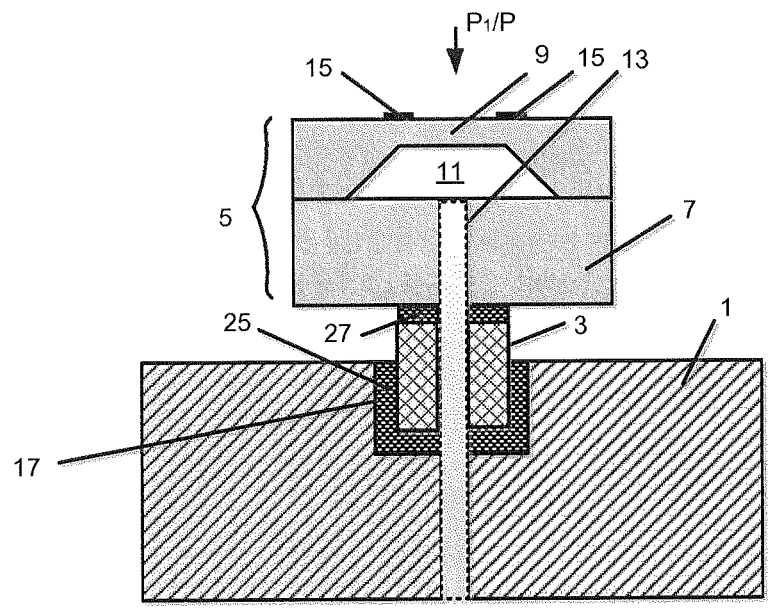
FIG. 3 shows: a pressure measuring device having a base glued in externally and at its end face.

A further alternative is formed by adhesive bonds 25, shown in FIG. 3, between base 3 and carrier 1, extending over the external jacket surface of base 3 and the end face, oriented towards the floor surface of carrier 1, of base 3.

Figure 2:
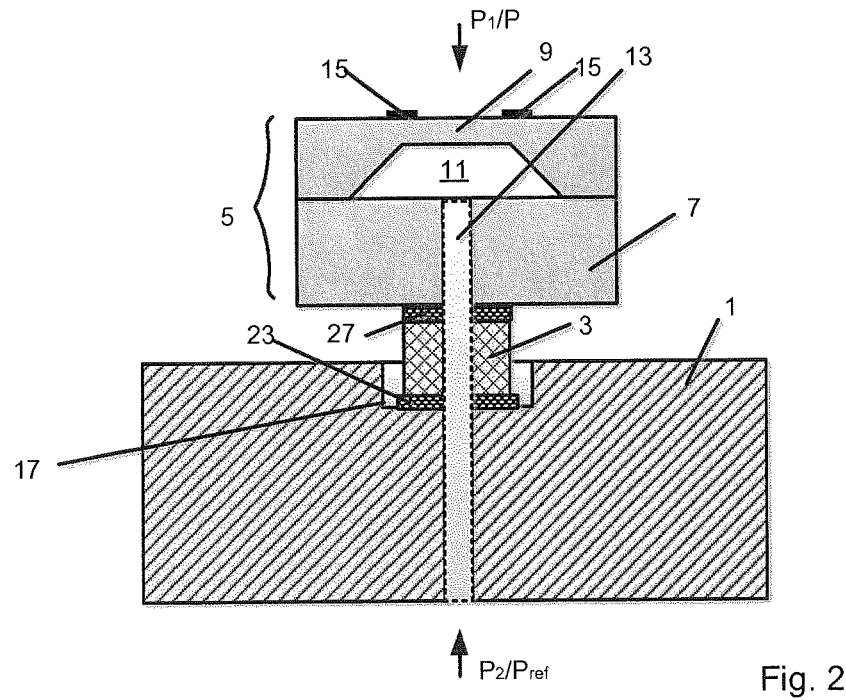
FIG. 2 shows: a pressure measuring device having a base glued in at its end face.

The specific embodiments shown in FIGS. 2 and 3 are suitable especially for pressure measuring devices having shorter bases 3—especially, bases 3 having an overall length on the order of 0.5 mm to 3 mm—and/or for pressure measuring devices in which—for example, for reasons of space—a depth of recess 17 cannot be provided that is adequately large for an exclusively external adhesive bond 19.

Both specific embodiments differ from the exemplary embodiment shown in FIG. 1 in the smaller depth of recess 17 and the region over which the respective adhesive bond 23 or 25 extends. In other respects, reference is made to the description of FIG. 1. In these specific embodiments as well—especially, in connection with bases 3 having a larger overall length—a centering device (not shown in FIGS. 2 and 3) for centering base 3 can be provided.

In all described adhesive bonds 19, 23, 25, the strength and tightness of the joint brought about by adhesive bond 19, 23, 25 is a function, on the one hand, of the choice of adhesive and, on the other hand, of the adhesive surface available for the bonding of base 3 and carrier 1. Correspondingly, the adhesive used to produce adhesive bond 19 is preferably selected as a function of the available adhesive surface and the demands on strength, which are a function of the pressure measurement range in which the pressure measuring device is to be used, a more elastic adhesive being used, the larger the available adhesive surface is and the lower the demands on strength are.

Here, it is to be kept in mind that the strength of adhesives is, as a rule, a function of temperature and, in some circumstances, the type of load on the adhesive bonds 19, 23, 25. While adhesive bond 19 surrounding base 3 externally is essentially exposed to shear forces, end-face adhesive bond 23 is essentially exposed to pressure stresses, and also to tensile stresses in the case of difference pressure measurements and relative pressure measurements. In both cases, however, loads on adhesive bonds 19, 23, 25 oriented from carrier 1 in the direction of pressure sensor 5 require a higher strength of the adhesive than do loads acting in the reverse direction, from pressure sensor 5 in the direction of carrier 1, because the latter are absorbed not only by the adhesive, but also by carrier 1.

Therefore, the modulus of elasticity of the adhesive that is used for the respective direction of load is a measure of the strength. Thus, for example as a function of the dimension of the components, the choice of material, and the size of the adhesive surface, in connection with a differential pressure measuring device according to the invention or absolute or relative pressure measuring devices according to the invention for measuring higher pressures—especially, pressures greater than or equal to 4 MPa (40 bar)—it can be advantageous to use an adhesive having a modulus of elasticity greater than or equal to 2,000 MPa—especially, a modulus of elasticity in the range of 2,000 MPa to 10,000 MPa. In contrast, for example as a function of the dimensions of the components, the choice of material, and the size of the adhesive surface, in connection with absolute or relative pressure measuring devices according to the present invention for measuring smaller pressures—especially, pressures less than or equal to 40 bar—depending upon the size of the adhesive surface, it can be advantageous to use an adhesive having a modulus of elasticity less than or equal to 2,000 MPa—especially, a modulus of elasticity in the range of 10 MPa to 1,000 MPa—and, in connection with absolute or relative pressure measuring devices for measuring smaller pressures—especially, pressures less than or equal to 4 MPa (40 bar)—depending upon the size of the adhesive surface, even adhesives having a modulus of elasticity less than or equal to 10 MPa can be advantageous.

All of the described adhesive bonds 19, 23, 25 offer the advantage that, through them, not only are thermomechanical stresses dissipated, but, moreover, a large spectrum of different materials of base 3 and carrier 1 can be bonded to one another.

Here, for carrier 1, with regard to its pressure strength, preferably a material is used having a high modulus of elasticity, and, with regard to its comparatively large volume, preferably a low-cost material, such as stainless steel, is used.

The material of base 3 can then be selected from a large number of different materials with regard to the specific demands made on the pressure measuring device. These materials include metals—especially, stainless steel, Kovar, or Invar—ceramics—especially, aluminum oxide ($Al_2O_3$), silicon carbide (SiC), silicon nitride ($Si_3N_4$), or aluminum nitride (AlN)—and glasses—especially, borosilicate glass.

Here, for the measurement of differential pressures or high absolute or relative pressures, such as pressures greater than or equal to 4 MPa (40 bar), preferably bases 3 are used made of a material having a high modulus of elasticity—especially, a modulus of elasticity greater than or equal to 200,000 MPa. Due to the comparatively high modulus of elasticity, influences, which are a function of the pressure acting on base 3, on the achievable measurement precision are largely prevented. For this purpose, especially suitable are bases 3 made of stainless steel, Kovar, Invar, or of ceramic, e.g., of aluminum oxide ($Al_2O_3$), silicon carbide (SiC), silicon nitride ($Si_3N_4$), or aluminum nitride (AlN). For measuring lower absolute or relative pressures, such as pressures in the range of up to 4 MPa (40 bar), materials having a lower modulus of elasticity, such as glass, can also be used.

Moreover, an electrical insulation of pressure sensor 5 from carrier 1 can be brought about via the choice of an insulator as material for base 3. An electrical insulation can be brought about, for example, by a base 3 made of glass, e.g., of borosilicate glass, or ceramic, e.g., aluminum oxide ($Al_2O_3$), silicon nitride ($Si_3N_4$), or aluminum nitride (AlN), wherein ceramic is preferably used for the measurement of differential pressures or high absolute or relative pressures, such as pressures greater than or equal to 4 MPa (40 bar), because ceramic has a significantly higher modulus of elasticity than do glasses.

In pressure measuring devices whose pressure sensors already have a base plate to be connected to base 3 or a membrane carrier made of an insulator, e.g., glass or ceramic, such an insulation is not required.

The second end of base 3, situated opposite the first end of base 3, bears pressure sensor 5 and is connected thereto via a joint 27. Joint 27 is preferably also an adhesive bond, having the advantages described above of a further reduction in thermomechanical stresses and great flexibility with regard to the materials that can be used as material for base 3. This adhesive bond can also be realized by, for example, an adhesive based upon epoxy resin, a thermoplastic adhesive, or a silicon adhesive—especially, a silicon rubber.

Adhesive bonds 19, 23, or 25 and 27, at both ends of base 3, offer the advantage that, through their interaction, a significant reduction in thermomechanical stresses is still brought about, even if both adhesive bonds 19, 23 or 25 and 27 are realized using an adhesive having a comparatively high modulus of elasticity.

Alternatively, pressure sensor 5 and base 3 can be connected using a different joining method, e.g., soldering.

For the further reduction in temperature-dependent stresses acting on pressure sensor 5—especially, its measurement membrane 9—base 3 is preferably made of a material that has a coefficient of thermal expansion that matches the coefficient of thermal expansion of pressure sensor 5. Related to the coefficient of thermal expansion of silicon of 2.6 ppm/K, for this purpose, borosilicate glasses are especially suitable, which have a coefficient of thermal expansion on the order of 3.2 ppm/K. In pressure measuring devices for measuring differential pressures or higher absolute or relative pressures, however, preferably a material is selected having a higher modulus of elasticity, such as Kovar, having a coefficient of thermal expansion on the order of 5 ppm/K, Invar, having a coefficient of thermal expansion on the order of 0.55 ppm/K, or ceramic, e.g., aluminum oxide ($Al_2O_3$), having a coefficient of thermal expansion on the order of 8.5 ppm/K, silicon carbide (SiC), having a coefficient of thermal expansion on the order of 3.5 ppm/K to 4.5 ppm/K, aluminum nitride (AlN), having a coefficient of thermal expansion on the order of 4 ppm/K to 5 ppm/K, or silicon nitride ($Si_3N_4$), having a coefficient of thermal expansion on the order of 2.8 ppm/K to 2.9 ppm/K.

In order to illustrate the influence of the various materials of base 3 on the temperature-dependent measurement errors of a pressure measuring device according to the present invention, temperature-dependent hystereses of differential pressure measurements carried out with the pressure measuring device shown in FIG. 1, with unloaded measurement membrane 9, were measured. In each case, the measurements took place by exposing both sides of measurement membrane 9 to the same pressure $p=p_1=p_2$, and the hystereses H were determined as the difference, related to the differential pressure measurement range of 50 kPa (500 mbar), between a differential pressure $\Delta p$ (25° C.) measured at an ambient temperature of 25° C., and a differential pressure Δp (135° C.) measured at an ambient temperature of 135° C., according to:

$$H = \left| \frac{\Delta p(25° C.) - \Delta p(135° C.)}{50 \text{ kPa (500 mbar)}} \right|$$

For all the measurements, bases 3 were used that were identical in design, glued into recess 17 with an epoxy resin adhesive having, at 25° C., a modulus of elasticity of 4500 MPa, the bases having an overall length of 5 mm, a length L running in recess 17 and glued in over the external jacket surface of 4.5 mm, and an outer diameter of 2 mm. For a base 3 made of stainless steel, the measurements showed a hysteresis H of 0.025%, and, for bases 3 made of aluminum oxide, Kovar, and borosilicate glass, in each case, hystereses H resulted of less than 0.005%.

Figure 4:
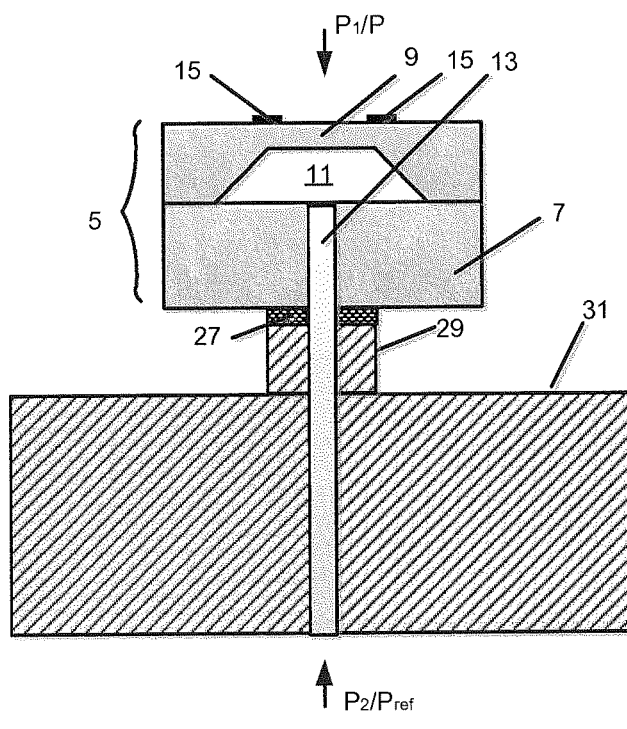
FIG. 4 shows: a pressure measuring device having a stainless steel carrier with a stainless steel base.

In comparison to this, with the pressure measuring device shown in FIG. 4, with an identically-fashioned pressure sensor 5 arranged on a stainless steel base 29, 0.5 mm in height, of a stainless steel carrier 31, by a joint realized identically to joint 27, under identical measurement conditions, a temperature-dependent hysteresis H of 0.125% was measured.

1 support
3 base
5 pressure sensor
7 membrane carrier
9 measurement membrane
11 pressure chamber
13 pressure transmission line
15 sensor elements
17 recess
19 adhesive bond
21 centering device
23 adhesive bond
25 adhesive bond
27 joint
29 stainless steel base
31 stainless steel carrier

The invention claimed is:

1. Pressure measuring device, having:
a carrier made of a metal; a base connected to said carrier;
a centering device for centering said base;
a pressure sensor mounted on said base wherein a bottom base surface of said pressure sensor is larger than a top base surface of said base, wherein the pressure sensor is mounted onto the top base surface of said base, wherein:
a recess is provided in said carrier;
said recess has a floor surface;
an end, oriented away from said pressure sensor, of said base is glued into said recess in said carrier by means of an adhesive bond;
a bottom base surface of said base is placed on said floor surface of said recess;
said centering device is formed by an inner side surface of said recess, said inner side surface of said recess tapering towards said floor surface of said recess, such that a base area of said recess at said floor surface corresponds to a base area of said bottom base surface of said base; and said adhesive bond between said carrier and said base extends over an external jacket surface of the end of said base running in said recess, the end of said base is placed on the floor surface of said recess.

2. The pressure measuring device, according to claim 1, wherein:
said carrier is made of stainless steel.

3. The pressure measuring device according to claim 1, wherein:
said base has an overall length of from 3 mm to 7.5 mm; and
said end of said base running in said recess has a length greater than or equal to 2.5 mm; and
said end of the base protruding from said recess and bearing said pressure sensor has a length on the order of 0.5 mm.

4. The pressure measuring device according to claim 1, wherein:
said adhesive bond between said carrier and said base extends over an end surface of said base oriented towards the floor surface of said recess.

5. The pressure measuring device according to claim 4, wherein:
said base has an overall length on the order of 0.5 to 3 mm.

6. The pressure measuring device according to claim 1, wherein:
said adhesive bond between said carrier and said base extends over the external circumferential surface of said end of said base running in said recess and an end surface of said base oriented towards the floor surface of said recess.

7. The pressure measuring device according to claim 1, wherein:
said base is made of stainless steel, Invar, or Kovar, of silicon carbide, or of a ceramic of aluminum oxide, silicon nitride, or aluminum nitride, or of borosilicate glass.

8. The pressure measuring device according to claim 1, wherein:
said adhesive bond between said base and said carrier comprises an adhesive bond upon epoxy resin, a thermoplastic adhesive, or a silicon rubber.

9. The pressure measuring device according to claim 1, wherein:
the pressure measuring device is a differential pressure measuring device or an absolute or relative pressure measuring device for measuring pressures greater than or equal to 4 MPa (40 bar); and
said base is made of a stainless steel, Invar, Kovar, or ceramic, aluminum oxide, silicon nitride, silicon carbide, or aluminum nitride having a modulus of elasticity greater than or equal to 200,000 MPa.

10. The pressure measuring device according to claim 1, wherein:
said base is made of a material that has a coefficient of thermal expansion matched to the coefficient of thermal expansion of said pressure sensor.

11. The pressure measuring device according to claim 1, wherein:
said base has a length in the range of 0.5 mm to 7.5 mm, an outer diameter in the range of 0.5 mm to 7 mm, and is bar-shaped, or has an inner diameter in the range of 0.25 mm to 4 mm.

* * * * *